March 1, 1927. 1,619,413
R. H. FOX
ROPE GUIDE ROLLER
Filed May 12, 1924

INVENTOR.
R. H. Fox

Patented Mar. 1, 1927.

1,619,413

UNITED STATES PATENT OFFICE.

RUDOLPH H. FOX, OF DENVER, COLORADO.

ROPE-GUIDE ROLLER.

Application filed May 12, 1924. Serial No. 712,686.

My invention relates to rope guide rollers and its primary object is to provide in a roller of this character, a well or reservoir for the constant lubrication of the bearing on which it is mounted.

A further object resides in the provision of means to seal the bearing against the admission of dust and dirt to the movably engaging parts thereof, and still other objects reside in details of construction and a novel arrangement and combination of parts as will hereinafter be more particularly described.

An embodiment of the invention has been illustrated in the accompanying drawings in the two views of which like parts are similarly designated and in which—

Figure 1:
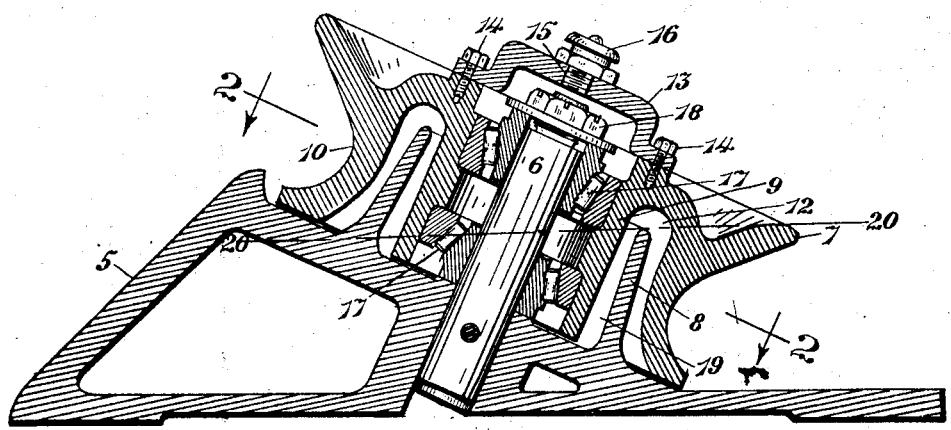
Figure 2:
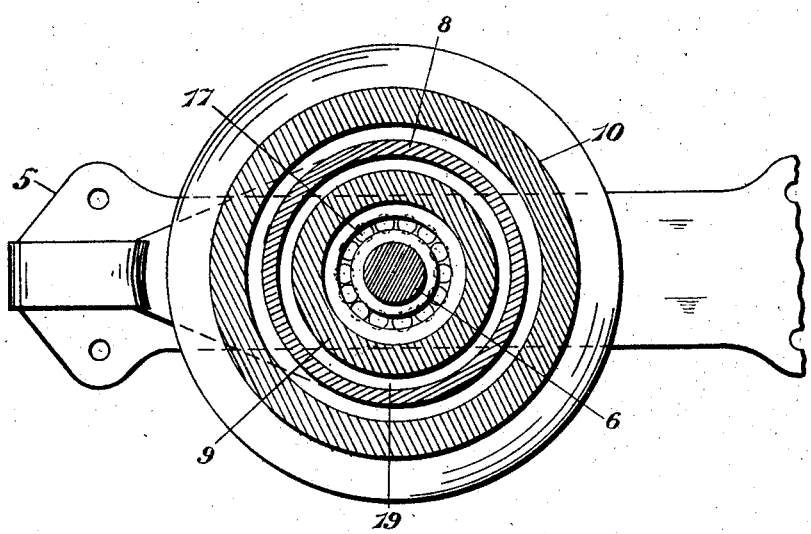

Figure 1 represents a sectional elevation of a rope-roller constructed in accordance with my invention; and Figure 2, a section taken on the line 2—2, Figure 1.

Referring to the drawings in detail, 5 designates a stationary base provided with a slanting axle 6 upon which a roller 7 is mounted for rotation.

The base has in concentric relation to the axle, a circular, preferably conical wall 8 which provides a cup-shaped reservoir of larger internal diameter at the base than at the rim, to contain a liquid or semi-liquid lubricant as will hereinafter be more fully described.

The roller comprises a grooved body of the conventional form which has an internal hollow hub 9 spaced from the circumferential rim 10 by an annular recess 12.

The bore of the hub is closed at its upper end by a cap 13 which is detachably secured by bolts 14 and the cap carries in a central opening 15, a screw plug 16 adapted to admit a lubricant to the interior of the roller.

The plug may be of any suitable construction, that shown in the drawing being particularly designed for the forcible injection of the lubricant by a pump or other similar appliance.

The roller is mounted for rotation upon the axle 6 by roller bearings 17 and it is held against displacement longitudinally of the axle by a nut 18 screwed upon the threaded end of the axle.

With the roller thus mounted, the circular cup 8 of the base extends in the recess 12 of the roller in spaced relation to the walls thereof and the annular space 19 between the cup and the hub of the roller constitutes a reservoir to contain a lubricant supplied through the plug at the top of the roller.

When the roller is at rest, the lubricant occupies the reservoir and the interior of the hub to a level denoted in the drawing by the broken line 20. Although said line as shown immerses the lower bearing only to the lubricant, it is obvious that by increasing the depth of the cup the upper bearing may lie below this line and thus may also be immersed.

When the roller is in motion with the liquid level in the position shown, the lower bearing runs in lubricant and the upper bearing is lubricated by the splash, or if the oil level is raised by the provision of a deeper cup both bearings may run in the lubricant. Furthermore, when the roller is in motion, the lubricant is thrown from the hub against the conical wall 8 and because of the inclination of this wall due to its conical form, the lubricant which is thrown outward by centrifugal force, is deflected downwardly and is thus prevented from escaping through the open upper end of the cup or reservoir.

The lubricant contained in the reservoir furthermore provides a liquid seal to prevent dust, dirt and moisture from reaching the bearings, and the roller which covers and encloses the reservoir, protects the lubricant against its being fouled by extraneous matter.

It will be evident that the slanting position of the roller depicted in the drawing, is not essential to the operation of the invention as herein described, and that the invention is equally adaptable to rollers mounted to rotate about a vertical axis, and it is to be understood that the external construction of the roller may be varied and that other modifications in the form, construction and arrangement of the parts may be resorted to without departing from the spirit of the invention as defined in the hereunto appended claim.

Having thus described my invention, what I claim and desire to secure by Letters Patent is:

A rope guide roller comprising a wheel having a hollow hub and an annular recess exteriorly thereof, a support having a circular wall extending in the recess in spaced relation to the hub to provide an outer oil compartment, a slanting shaft on the support coaxial with the hub and in spaced relation to the wall thereof to provide an inner oil compartment, upper and lower bearings supporting the wheel on the shaft within the hub, the compartments being in communication to conjointly provide an oil reservoir the outer wall of which terminates in a plane above the lower bearing.

In testimony whereof I have affixed my signature.

RUDOLPH H. FOX.